United States Patent [19]
Benesch

[11] Patent Number: 5,415,602
[45] Date of Patent: May 16, 1995

[54] TRANSMISSION DEVICE

[76] Inventor: Lloyd Benesch, 29 Old Meeting House Rd., Auburn, Mass. 01501

[21] Appl. No.: 29,736

[22] Filed: Mar. 11, 1993

[51] Int. Cl.⁶ ............................................. F16H 3/44
[52] U.S. Cl. ................................... 475/169; 475/170
[58] Field of Search .................................. 475/169, 170

[56] References Cited

U.S. PATENT DOCUMENTS

| | | |
|---|---|---|
| 1,524,097 | 1/1925 | Logan . |
| 3,189,271 | 6/1965 | Rapiserda . |
| 3,507,162 | 4/1970 | Nomura et al. . |
| 3,656,596 | 4/1972 | Morgan . |
| 3,750,487 | 8/1973 | King . |
| 3,753,452 | 8/1973 | Zebley . |
| 3,876,148 | 4/1975 | Cushing et al. . |
| 3,877,724 | 4/1975 | Chase . |
| 3,989,201 | 11/1976 | Cottrell . |
| 4,005,618 | 2/1977 | Cohen . |
| 4,117,652 | 10/1978 | Jones et al. . |
| 4,178,812 | 12/1979 | Kemper . |
| 4,206,660 | 6/1980 | Brown . |
| 4,241,618 | 12/1980 | Smirl . |
| 4,249,993 | 2/1981 | Stegelitz et al. . |
| 4,410,329 | 10/1983 | Blevins et al. . |
| 4,411,664 | 10/1983 | Richand et al. . |
| 4,426,916 | 1/1984 | Wimberley . |
| 4,433,594 | 2/1984 | Smirl . |
| 4,440,036 | 4/1984 | Hooker et al. . |
| 4,470,326 | 9/1984 | Schmidt . |
| 4,497,221 | 2/1985 | Koser ................................. 74/793 |
| 4,529,393 | 7/1985 | Makishima . |
| 4,539,867 | 9/1985 | Ishimi ................................. 74/793 |
| 4,738,590 | 4/1988 | Butler . |
| 4,738,591 | 4/1988 | Butler . |
| 4,916,974 | 4/1990 | Kozakae et al. ................. 475/166 |
| 4,936,155 | 6/1990 | Gogias . |
| 4,990,126 | 2/1991 | Ideta et al. . |
| 5,055,094 | 10/1991 | Cataldo . |
| 5,098,350 | 3/1992 | Sackschewsky . |
| 5,176,588 | 1/1993 | Sackschewsky . |

FOREIGN PATENT DOCUMENTS

62-83532  4/1987  Japan .

*Primary Examiner*—John T. Kwon
*Attorney, Agent, or Firm*—Kenyon & Kenyon

[57] ABSTRACT

A Benesch transmission transmits power from an input shaft to an output shaft, wherein the input shaft defines a first axis and the output shaft defines a second axis, includes a first member including a contacting surface which extends along at least a portion of a circle. The first member is coupled to the input shaft such that, upon rotation of the input shaft about the first axis, the first member moves so that a central axis of the circle orbits the first axis, and wherein a distance between the central axis and the first axis is variable. A plurality of second members are coupled to the output shaft and extend away from the second axis. Each of the second members extends within the circle such that, upon motion of the first member relative to the first axis, contact between the contacting surface and the second members causes rotation of the output shaft about the second axis.

18 Claims, 12 Drawing Sheets

TRANSMISSION DEVICE

FIELD OF THE INVENTION

The present invention relates generally to power transmission devices and, more specifically, to variable transmission devices.

BACKGROUND OF THE INVENTION

In the past, devices have employed transmissions for varying the rotational speed of an output shaft relative to the rotational speed of an input shaft. Many of these transmissions include a plurality of gears coupled to the output shaft, any one of which may be engaged with a respective gear on the input shaft to achieve a desired gearing ratio. The number of gearing ratios available with these transmissions is limited by the number of gears provided on the output shaft. In addition, the input and output shafts must be momentarily disengaged in order to selezt a new gearing ratio. This introduces discontinuities into the acceleration or deceleration of the output shaft.

Continuously variable pulley transmissions have been employed in vehicle power train transmissions. These transmissions require a separate mechanism in order to simultaneously adjust the configuration of the input and output shaft pulleys thereby adding to the size and complexity of the transmission.

Thus, there is need for a less complicated transmission which is capable of providing a wide range of gearing ratios while minimizing any discontinuities in the acceleration and deceleration of the output shaft.

SUMMARY OF THE INVENTION

The present invention is directed to an apparatus which transmits power from an input shaft defining a first axis to an output shaft defining a second axis. This Benesch transmission includes a first member including a surface which extends along at least a portion of a circle, the member being coupled to the input shaft such that, upon rotation of the input shaft about the first axis, the first member moves so that the center of the circle orbits the first axis. The distance between the first axis and a central axis extending through the center of the circle, parallel to the first axis, is variable. A plurality of second members are coupled to the output shaft and extend radially away from the second axis within the circle such that, upon motion of the first member relative to the first axis, contact between the first member and the second members causes rotation of the output shaft about the second axis.

DETAILED DESCRIPTION

Referring to FIGS. 1-6, a power transmission according to the present invention is indicated generally by the numeral 10. The transmission 10 includes an input shaft 12, which is coupled to an electric motor (not shown) by means of a belt mounted in a pulley 16. The input shaft 12 enters a rearward end 11 of the transmission 10 through a hole in a back plate 18 of the transmission housing 20 and extends into the transmission 10, through a bearing 21, to a lateral member 22 which is coupled to the input shaft 12. Two members 24 and 26 are rotatably coupled to opposite ends of the lateral member 22 substantially equidistant from an input axis defined by the input shaft by means of pins 28 and 30, respectively. Slotted circular members 23 are rotatably mounted within members 24 and 26. A projection 33 of a member 27 is received within the slot of each of the slotted circular members 23. The member 27 is coupled to the bearing 21 such that the members 24 and 26 rotate about pins 28 and 30, respectively, when the distance between the bearing 21 and the lateral member 22 is varied. The bearing 21 is mounted to a plate 13 which includes a plurality of projections 17. Each of these projections 17 is slidably received in a corresponding channel 25 formed in a reduced diameter portion 19 of the transmission housing 20. As the channels are formed parallel to the input axis, the plate 13 may move forward and rearward in a direction parallel to the input axis but may not rotate about the input axis. Each projection 17 includes an outer threaded surface 15. The outer threaded surface 15 engages a corresponding inner threaded portion of a rear housing member 29 which is rotatably mounted around the reduced diameter portion 19 so that, when the rear housing member 29 is rotated, the outer threaded surfaces 15 of the projections 17 are engaged by the corresponding inner threaded surface of the rear housing member 29. This causes the plate 13 and, consequently, the bearing 21 to move forward or rearward (depending on the direction of the rotation of the rear housing member 29) relative to the back plate 18 and the lateral member 22.

Figure 1:
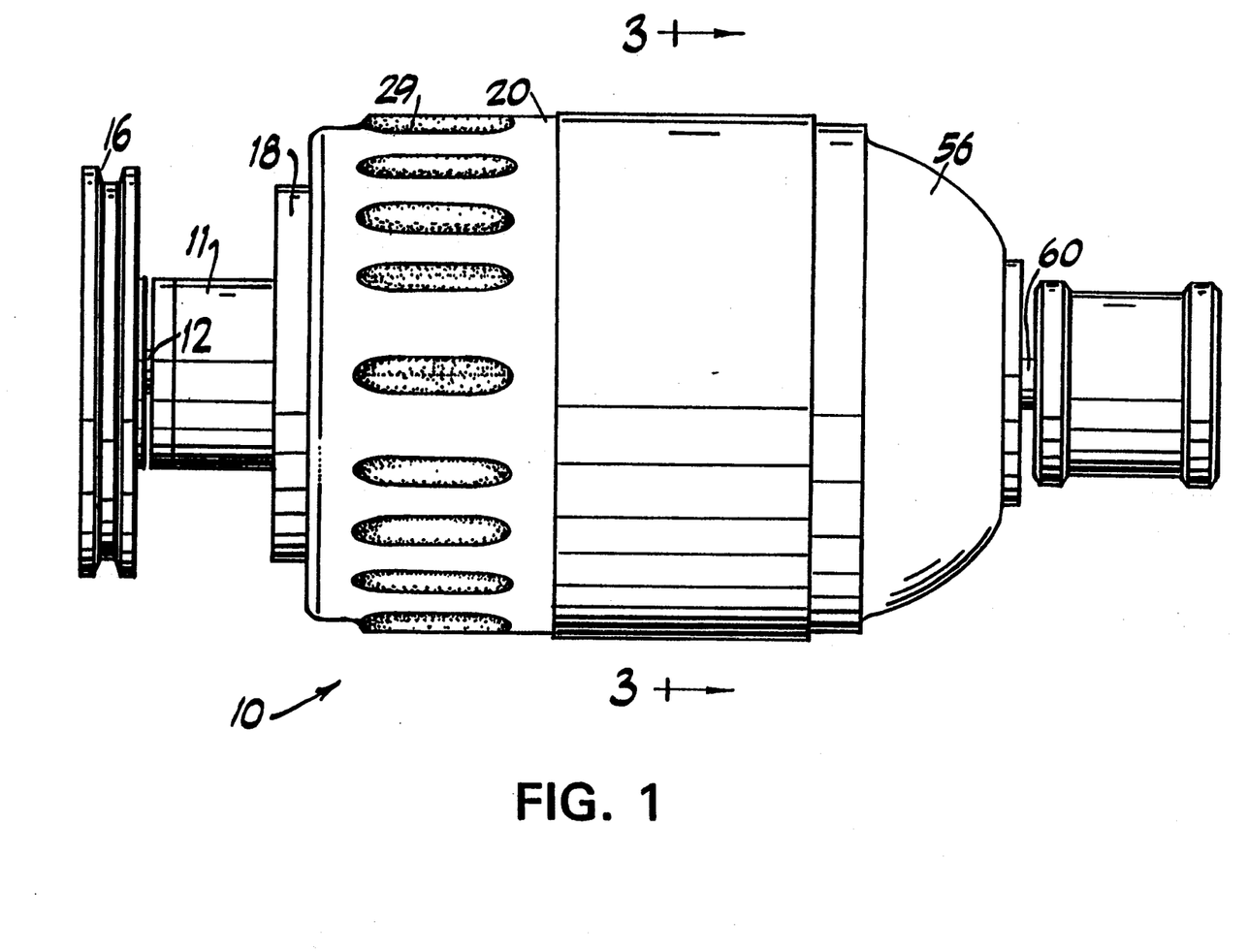
FIG. 1 shows a Benesch transmission according to the present invention.
Figure 2:
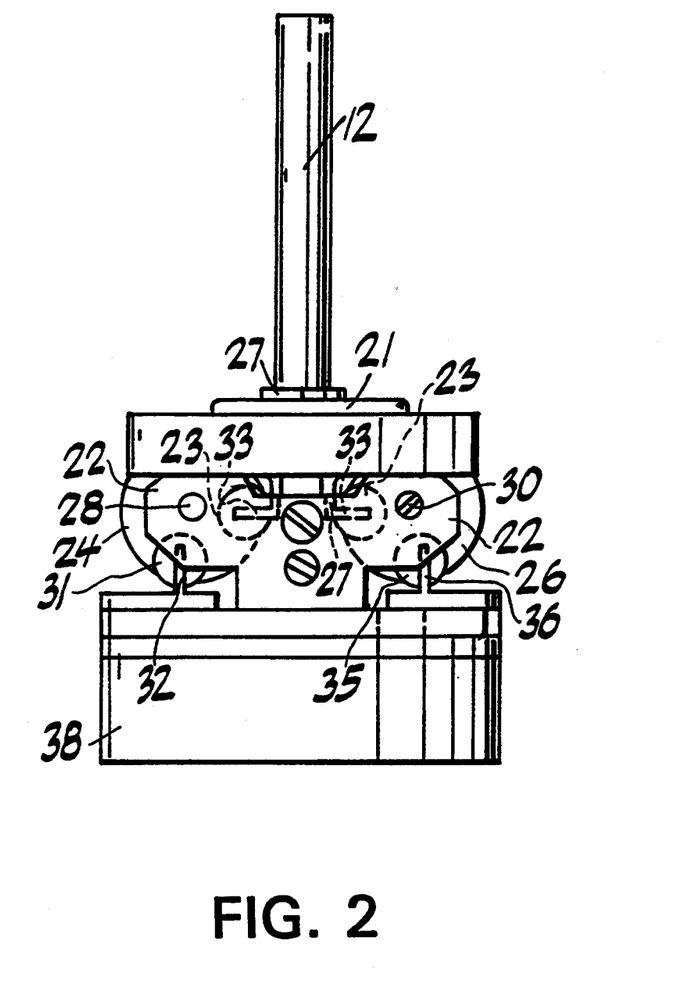
FIG. 2 is a side view of a crank shaft of the Benesch transmission of FIG. 1, wherein a portion of a counterweight has-been removed and the transmission is in a neutral position.
Figure 4:
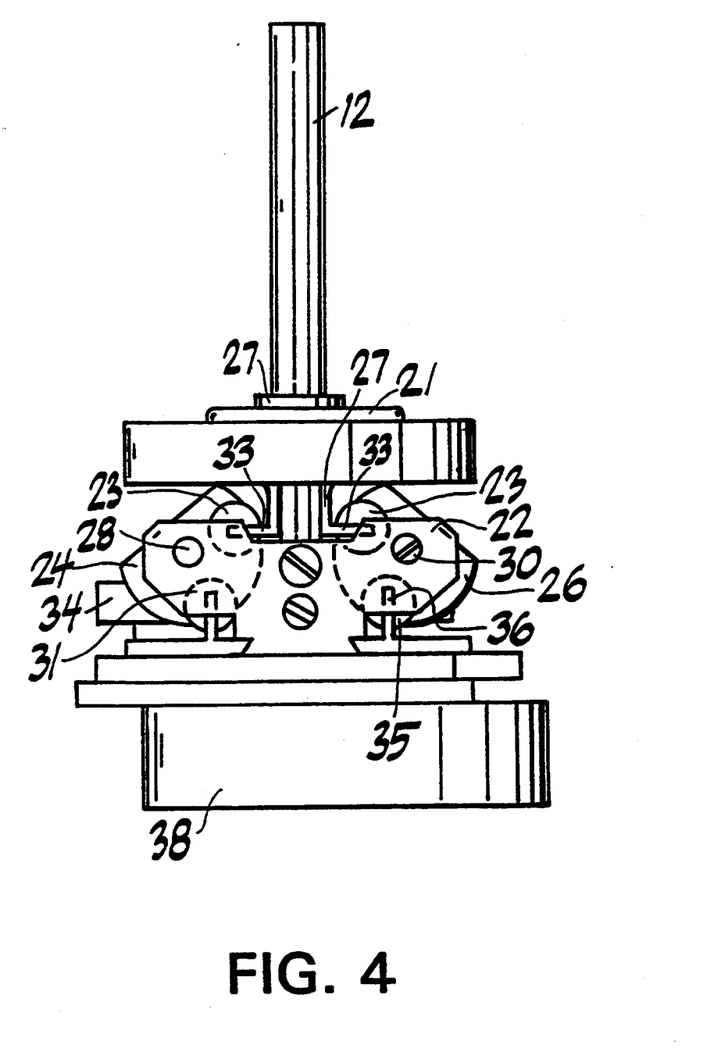
FIG. 4 is a side view of a crank shaft of the Benesch transmission of FIG. 1, wherein a portion of a counterweight has been removed and the transmission is in a non-neutral position.

The member 24 rotatably receives a slotted circular member 31. A projection 32 which is formed on a moveable crank shaft 38 is received in the slot of the member 31. When the distance between the bearing 21 and the lateral member 22 is increased, the member 24 will rotate counter-clockwise as seen in FIGS. 2 and 4. This rotation of the member 24 relative to the projection 32 causes the moveable crank shaft 38 to move away from the input axis, to the right as seen in FIG. 4. The member 26 rotatably receives a slotted circular member 35. A projection 36 formed on a counterweight 34 is received in the slot of the member 35. When the distance between the bearing 21 and the lateral member 22 is increased, the member 26 will rotate clockwise as seen in FIG. 2. This rotation of the member 26 relative to the projection 36 causes the counterweight 34 to move away from input the axis, to the left as seen in FIG. 4.

Figure 3:
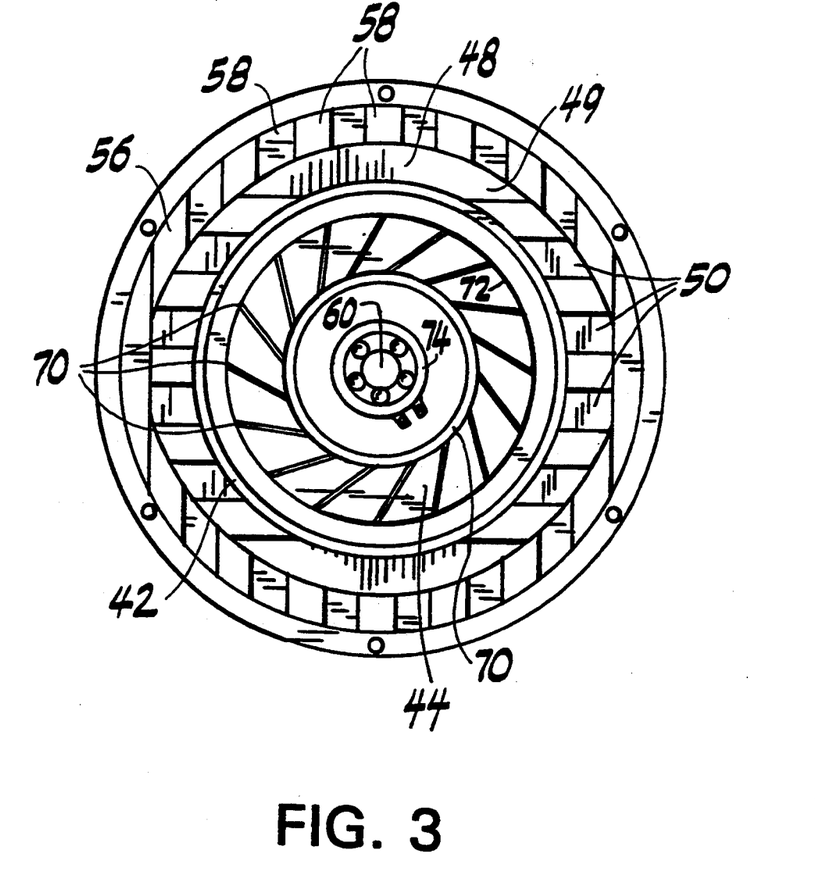
FIG. 3 is a cross-sectional view of the Benesch transmission of FIG. 1, taken along line 3—3 of FIG. 1, wherein the transmission is in a neutral position.
Figure 5:
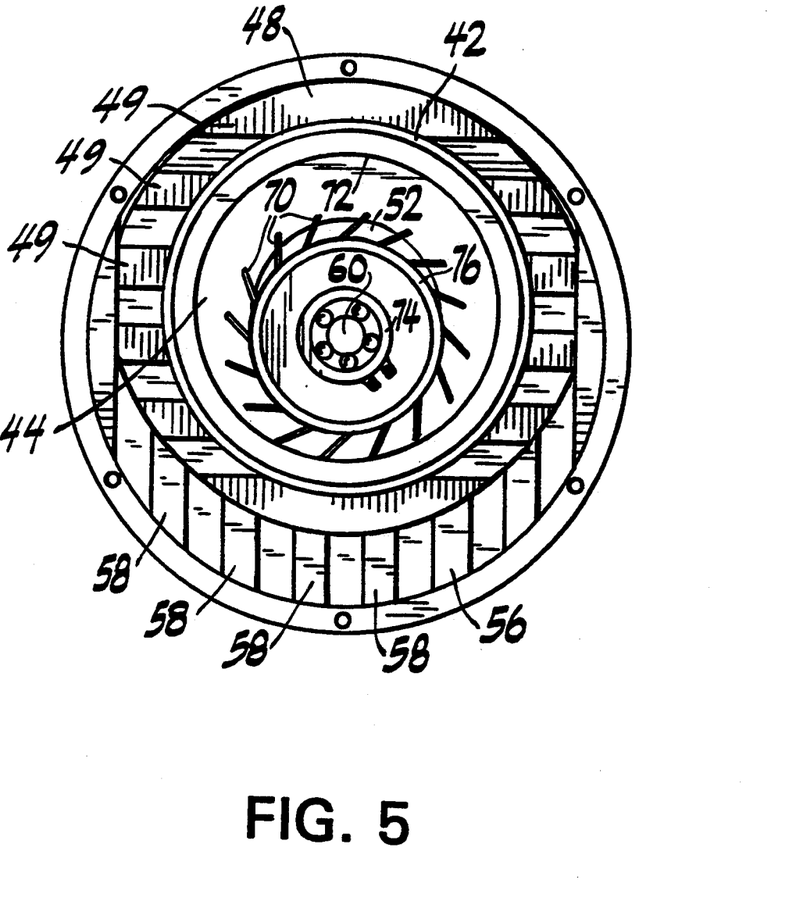
FIG. 5 is a cross-sectional view of the Benesch transmission according to a first embodiment of the present invention, taken along the line 3—3 of FIG. 1, wherein the transmission is in a non-neutral position.
Figure 6:
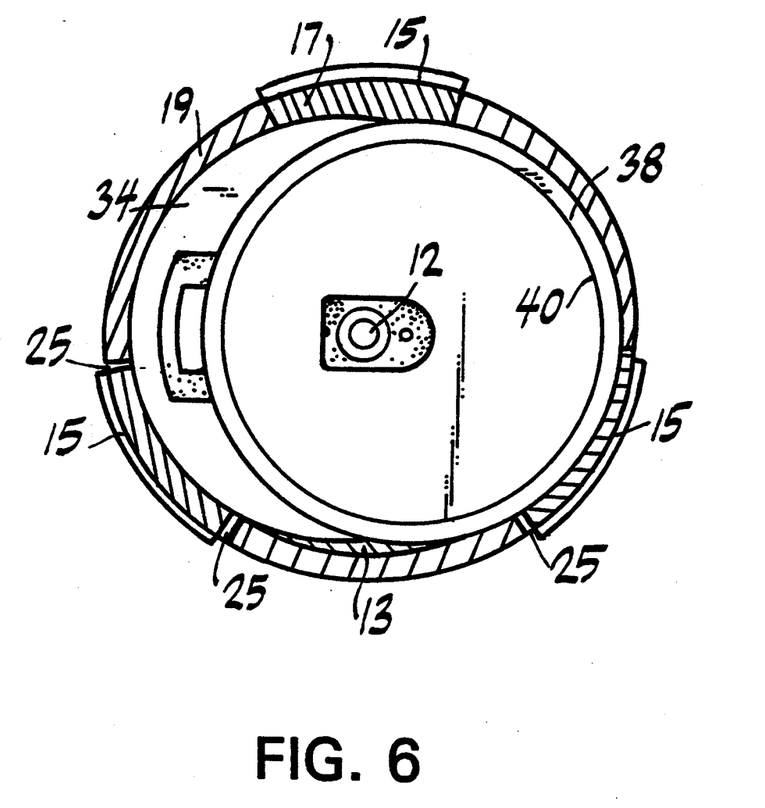
FIG. 6 is a bottom view of a crank shaft of the Benesch transmission according to the first embodiment, wherein the transmission is in a non-neutral position.
Figure 7:
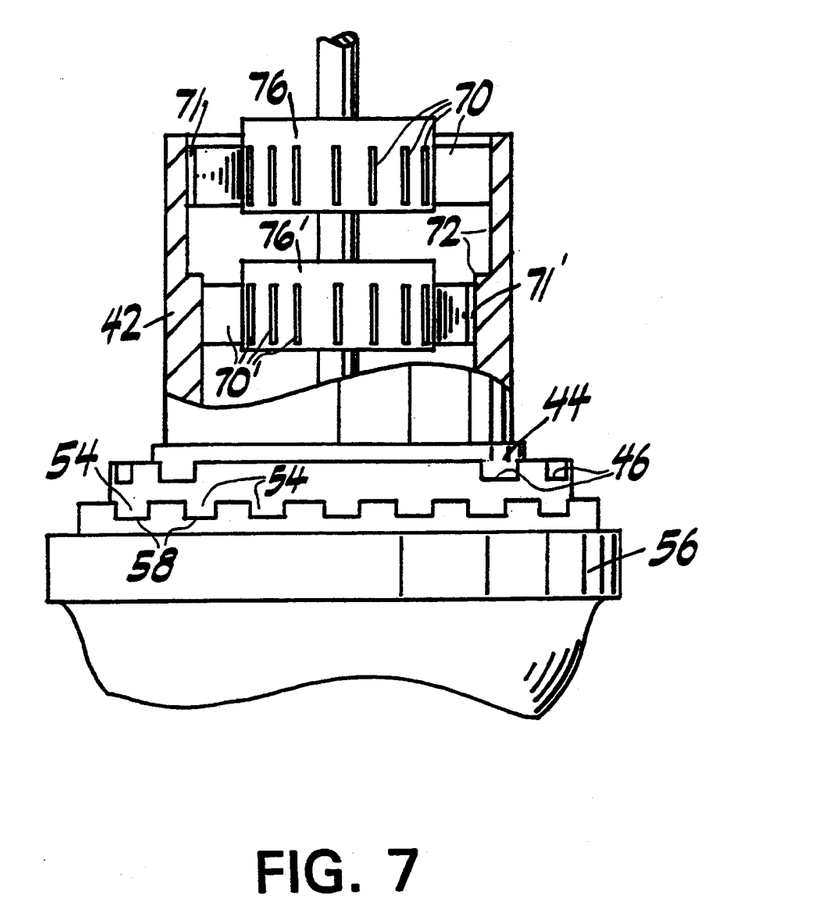
FIG. 7 is a partially cross-sectional view of a power transmission according to a second embodiment of the present invention, taken along line 2—2 of FIG. 1.

The crank shaft 38 includes a cylindrical inner surface 40, which may be formed of a low friction material such as teflon, adapted to slidably receive a cylindrical member 42 such that the central axes defined by the cylindrical surface 40 and the cylindrical member 42 are substantially coincident. As shown in FIGS. 3, 5 and 7, a disc member 44, which is mounted to a forward end of the cylindrical member 42, includes a plurality of parallel projections 46 of rectangular cross-section which extend across the entire forward surface of the disc member 44. A rearward surface 49 of a plate member 48 includes a plurality of parallel grooves 50 of rectangular cross-section. The plate member 48, which may be formed of a low friction material such as teflon, is mounted adjacent to the disc member 44 so that each rectangular projection 46 of the disc member 44 is received in a corresponding rectangular groove 50. Thus, the disc member 44 is slidably mounted to the plate member 48 such that it and, consequently, the cylindrical member 42 may move, relative to the plate member 48, only in a direction parallel to the rectangular grooves 50.

A forward surface of the plate member 48 includes a plurality of parallel projections 54 of rectangular cross-section which extend across the entire forward surface of the plate member 48. A rearward surface of a forward member 56 includes a plurality of parallel grooves 58 of rectangular cross-section. The forward member 56 is mounted adjacent to the plate member 48 so that each rectangular projection 54 is received in a corresponding rectangular groove 58. Thus, the plate member 48 is slidably mounted to the forward member 56 such that it may move, relative to the forward member 56, only in a direction parallel to the rectangular grooves 58. The forward member 56 is preferably substantially rigidly mounted to the transmission housing 20.

A hole 52 is formed through the center of the disc member 44. An output shaft 60 extends from a rearward end, through the hole 52 in the disc member 44, through the plate member 48 and is mounted for rotation about an output axis. Thereafter, the output shaft 60 extends through a bore formed in the forward member 56 to a forward end 68 located outside the transmission housing 20.

A dog unit 73, which is comprised of a plurality of dogs 70 and a circular spacer 76, includes a spring mechanism which is biased to urge the dogs 70 to extend further through the circular spacer 76 away from the center of the circular spacer 76. Each of the plurality of dogs 70 is coupled to the output shaft 60 such that it extends substantially tangentially away from the circular spacer 76 which is centered about the output shaft 60. Those skilled in the art will understand that, although the dogs 70 are shown contacting an inner cylindrical surface 72 of the cylindrical member 42 at an angle of approximately 60°, depending on the diameter of the inner cylindrical surface 72, the required power output of the transmission and the strength of the dogs 70, etc., the orientation and/or configuration of the dogs 70 may be altered to achieve any desired angle of contact with the inner cylindrical surface 42. The dogs 70 extend away from this circle toward the inner cylindrical surface 72, which includes a plurality of grooves oriented substantially parallel to the central axis of the cylindrical member 42. A spring 74 is coupled between the output shaft 60 and the dogs 70 and is biased to urge the dogs 70 away from the output shaft 60 and away from each other. Each of the dogs 70 passes through the spacer 76 and extends toward the inner cylindrical surface 72. When in the neutral position, as shown in FIG. 3, each dog 70 is fully extended away from the spacer 76 and contacts the inner cylindrical surface 72. Those skilled in the art will understand that this clockwise angling of the dogs 70, as seen in FIG. 3, allows the output shaft 60 to be rotated counterclockwise freely while providing a ratchet action which prevents the output shaft 60 from being rotated clockwise when the transmission is in the neutral position.

In operation, the rear housing 29 is rotated until the transmission is in the neutral position before the power to the electric motor is switched on. As the transmission is in the neutral position, the center of gravity of the counter weight 34 is located on the input axis and the central axis of the moveable crank shaft 38 is coincident with the input axis. When the electric motor is switched on, the input shaft 12 rotates at a substantially constant speed and the moveable crank shaft 38 rotates freely about the cylindrical member 42. As stated previously, the cylindrical member 42 can not rotate about its central axis. Thus, when the moveable crank shaft 38 is centered, the cylindrical member 42, the dogs 70 and the output shaft 60 are stationary and the transmission is in neutral.

In order to transmit power to the output shaft, the rear housing 29 is rotated, thereby gradually moving the bearing 21 rearward relative to the lateral member 22. This pushes the member 27 rearward and consequently causes the members 24 and 26 to rotate about pins 28 and 30, respectively. The rotation of gear 24 causes the counter weight 34 to move so that its center of gravity is displaced from the input axis in a first direction. Rotation of the gear 26 causes the moveable crank shaft 38 to move such that its central axis is displaced from the input axis in a direction opposite to the displacement of the center of gravity of the counter weight 34. As the moveable crank shaft 38 is moved away from the input axis, the horizontal and vertical components of the rotation of the inner cylindrical surface 40, as seen in FIG. 3, are transmitted to the cylindrical member 42 which is slidably received within the moveable crank shaft 38. This causes the disc member 44 to move relative to the plate member 48 in a direction parallel to the rectangular grooves 50 and causes the plate member 48 to move, relative to the forward member 56, in a direction parallel to the rectangular grooves 58. Thus, the cylindrical member 42 orbits the input axis counterclockwise as seen in FIG. 3, without rotating about its own central axis. The orbiting motion of the cylindrical member 42 brings the dogs 70 into and out of contact with the grooved inner surface 72 of the cylindrical member 42 and causes the dogs 70 and, therefore, the output shaft 60 to rotate counterclockwise as seen in FIG. 5. Further rotation of the rear housing 29 increases the distance between the central axis of the moveable crank shaft 38 and the input axis. The larger the distance between the central axis of the moveable crank shaft 38 and the input axis, the greater the extent of the transverse movement of the cylindrical member 42 and the greater the motion of the outer ends of the dogs 70. Thus, the rotational speed of the output shaft 60 is increased gradually as the rear housing 29 is rotated further from the neutral position. Those skilled in the art will recognize that, although the maximum rotational speed of the output shaft 60 will be lower than the rotational speed of the input shaft 12, the rotational speed of the output shaft 60 may be increased to a desired rotational speed through the use of conventional regearing devices. In addition, those skilled in the art will recognize that many well known devices may be employed to adjust the distance between the central axis of the moveable crank,shaft 38 and the input axis. For example, servo motors which may be operated manually or electronically controlled may be used.

FIG. 7 shows a cross-sectional view of a Benesch transmission according to a second embodiment of the present invention. The device according to the second embodiment shows a Benesch transmission which includes a first plurality of dogs 70 wherein each of the dogs 70 extends substantially tangentially away from a circular spacer 76 centered about the output shaft 60 such that each dog 70 is angled counter-clockwise when viewed from the rear and a second plurality of dogs 70' wherein each of the dogs 70' extends substantially tangentially away from a circular spacer 76' centered about the output shaft 60 such that each dog 70' is angled clockwise when viewed from the rear. The first and second pluralities of dogs 70 and 70', respectively, are located within the cylindrical member 42 and operate such that, an orbiting motion of the cylindrical member 42 in the first direction, brings contacting surfaces 71 of the dogs 70 into and out of contact with the grooved inner surface 72 of the cylindrical member 42 and causes the dogs 70 and, therefore, the output shaft 60 to rotate counter-clockwise in a second direction opposite the first direction. However, an orbiting motion of the cylindrical member 42, in the second direction, brings contacting surfaces 71' of the dogs 70' into and out of contact with the grooved inner surface 72 of the cylindrical member 42 and causes the dogs 70' and, therefore, the output shaft 60 to rotate in the first direction. When in the neutral position, the angling of the outer portions of the dogs 70 and 70' provides a ratchet action which prevents the output shaft from being rotated in either direction.

Figure 8:
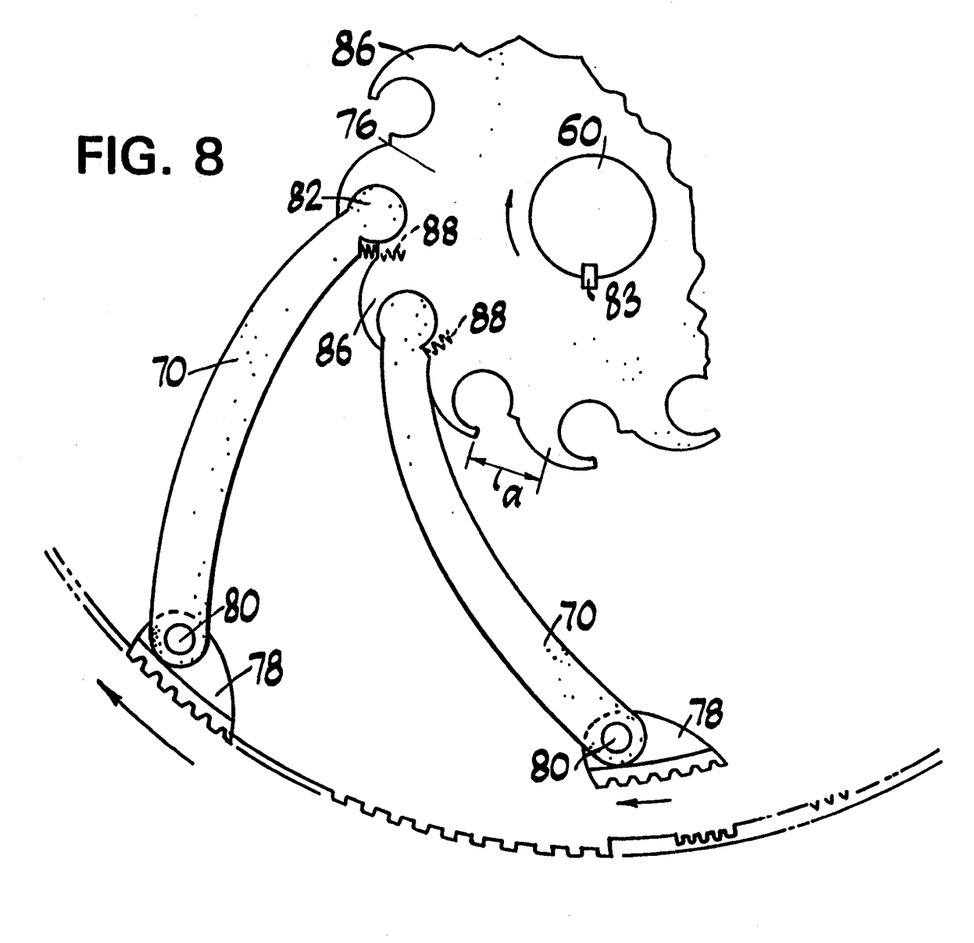
FIG. 8 is a cross-sectional view of a Benesch transmission according to a third embodiment of the invention, taken along line 3—3 of FIG. 1.

FIG. 8 shows a cross-sectional view of a Benesch transmission according to a third embodiment of the present invention. The device according to the third embodiment shows a more sturdy design of the dog unit 73, the dogs 70 and the cylindrical member 42. The dogs 70 of the device according to the third embodiment include geared feet 78 which are rotatably mounted to the outer ends of the dogs 70 by means of pins 80. In addition, the dogs 70 are formed of curved substantially rigid members the initial portions of which are rotatably mounted to the spacer 76 by means of pins 82 each of which is rigidly connected to a corresponding dog 70. The spacer 76 is non-rotatably mounted to the output shaft 60 by means of a key 83. The angle of rotation permitted to each dog 70 is limited by the size of the space "a" between the projections 86 on the spacer 76.

Figure 9:
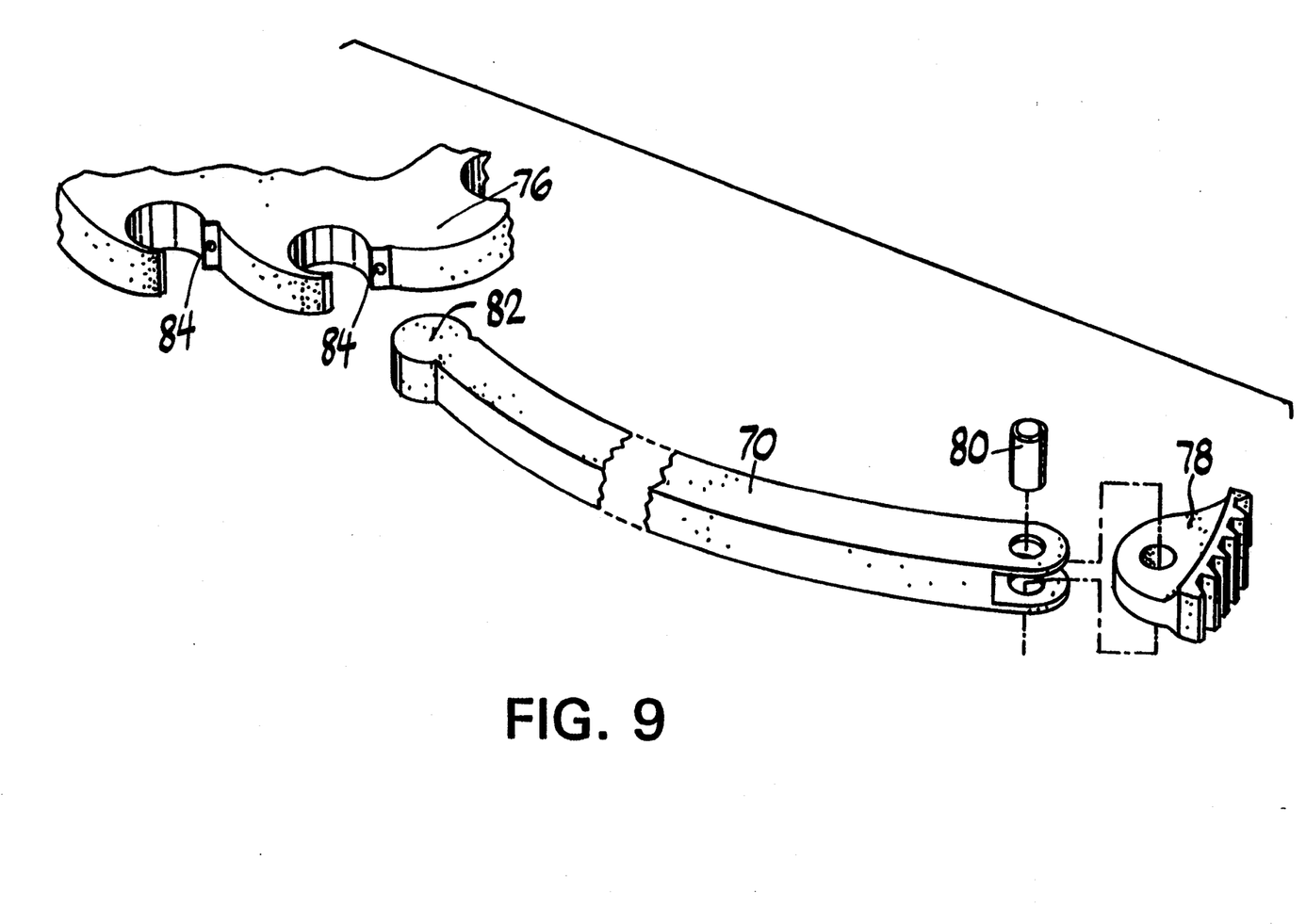
FIG. 9 is a partial perspective view of a Benesch transmission according to the third embodiment of the present invention.

In addition, as seen in FIG. 9, the spacer 76 may include a plurality of bores 84 each of which is adapted to receive a spring 88. One end of each spring 88 is coupled to the spacer 76 while the other end is coupled to a respective dog 70 so that each dog 70 is urged into a rest position. As shown in FIG. 8, these springs may alternatively be mounted to the surface of the spacer 76.

Figure 10:
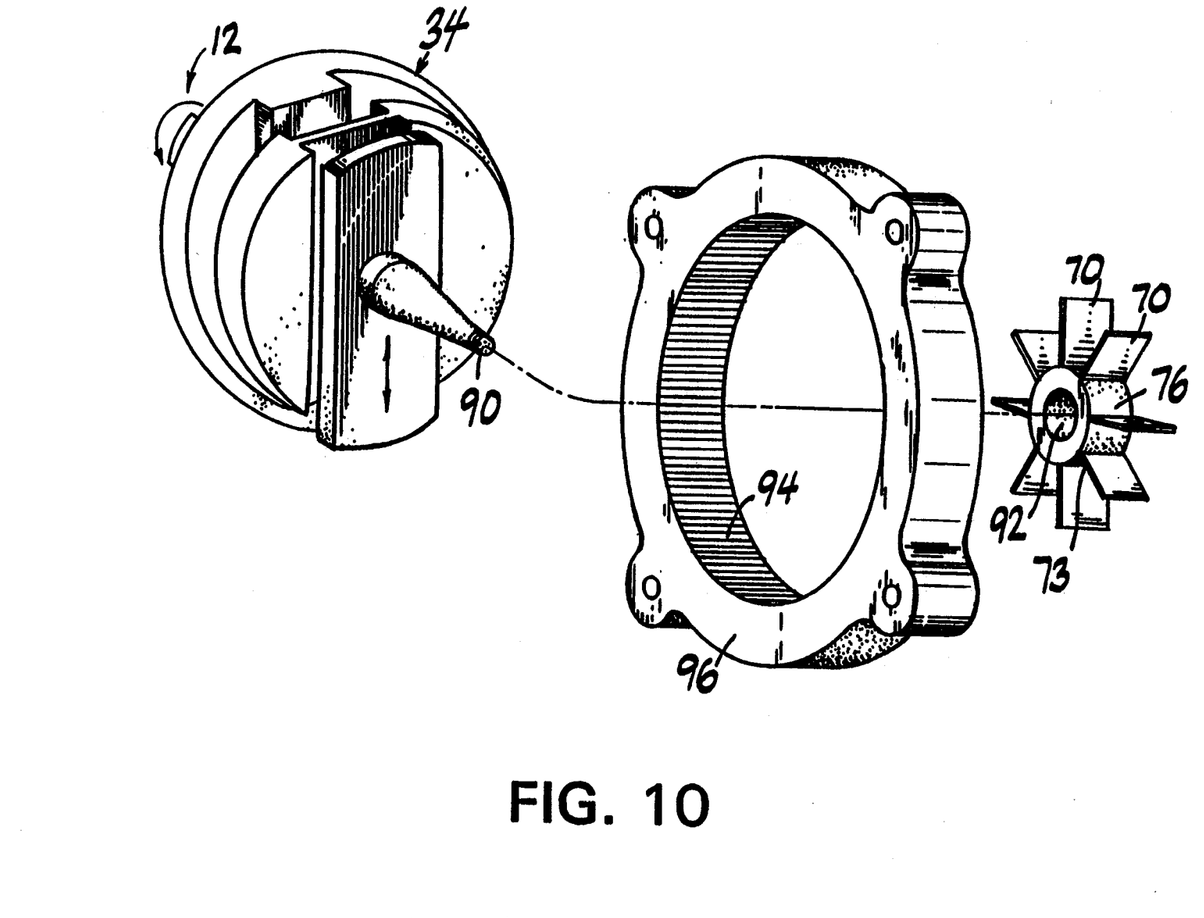
FIG. 10 shows a transmission according to a fourth embodiment of the present invention.
Figure 11:
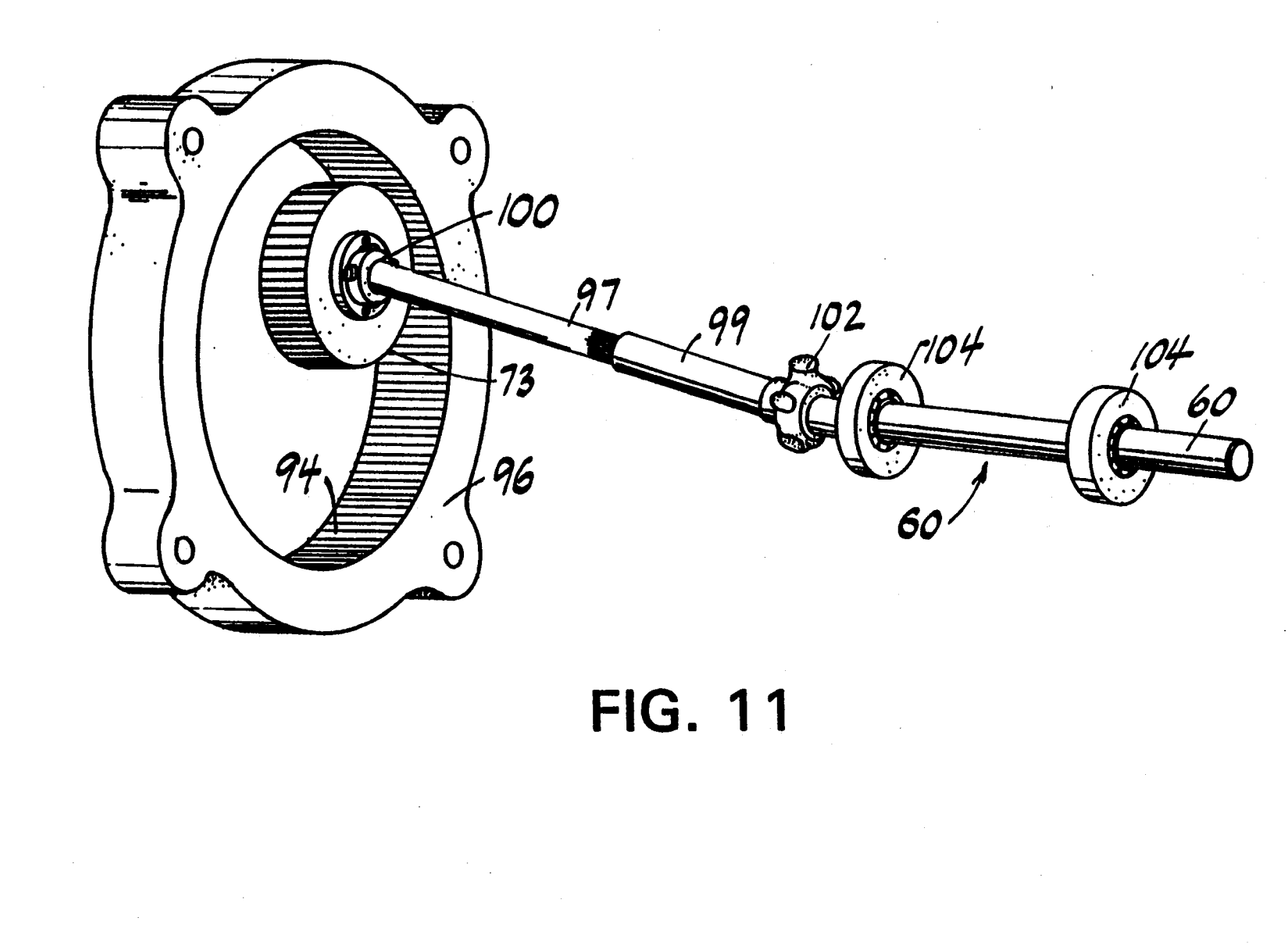
FIG. 11 shows the arrangement of the output shaft of the transmission of FIG. 10.
Figure 12:
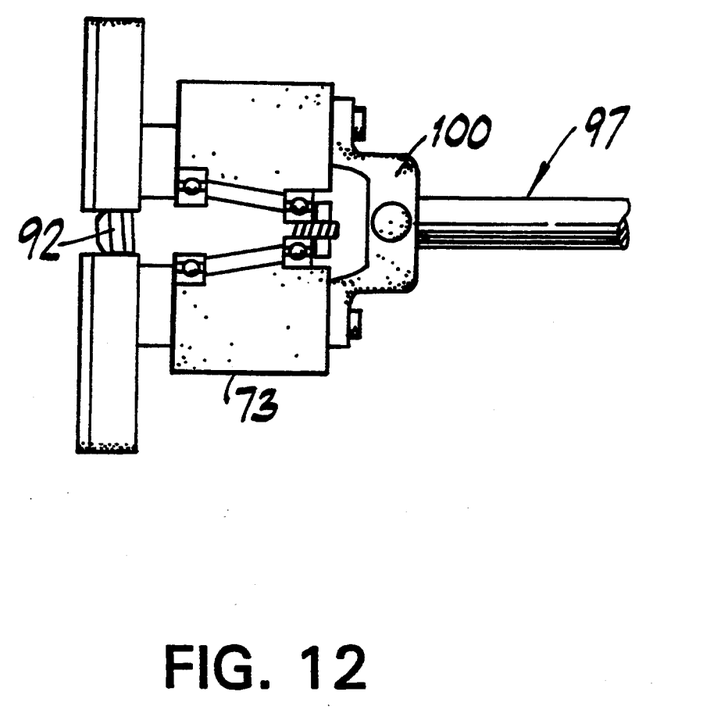
FIG. 12 shows side view of the output shaft and a cross-sectional view of the dog unit of the transmission of FIG. 10.

FIGS. 10–12 show a Benesch transmission according to a fourth embodiment of the present invention the wherein a mechanism, which may be constructed as described in regard to the first embodiment, is employed to move a counterweight 34 away from the input axis in a first direction while moving a spindle 90 a corresponding distance away from the input axis in the opposite direction. The spindle 90 is rotatably received in a bore 92 formed through the center of a dog unit 73 which may be constructed as described in regard to the first embodiment. The dog unit 73 is received within an inner geared cylindrical surface 94 of a stationary housing 96. A forward end 98 of the dog unit 73 is coupled to a rearward end of a splined shaft 97 by means of a rearward universal gear 100. The forward end of the splined shaft 97 is received in a shaft 99 including a hollow rearward portion. The shaft 99 is coupled to the output shaft 60 by means of a forward universal gear 102 and the output shaft 60 is mounted within bearings 104 for rotation about the output axis. This coupling between the dog unit 73 and the output shaft 60 allows the output shaft 60 to rotate about the output axis when the dog unit 73 moves orbitally about this axis within the inner cylindrical surface 94.

In operation, rotation of the input shaft 12 causes rotation of the counterweight 34 and the spindle 90. When the spindle 90 is located on the input axis, the transmission 10 according to the fourth embodiment is shaft 60 to rotate about the output axis when the dog unit 73 moves orbitally about this axis within the inner cylindrical surface 94.

In operation, rotation of the input shaft 12 causes rotation of the counterweight 34 and the spindle 90. When the spindle 90 is located on the input axis, the transmission 10 according to the fourth embodiment is in the neutral position and the dogs 70 are fully extended from the circular spacer 76 so that they contact the inner geared surface 94 of a stationary cylindrical housing 96. When in the neutral position, the spindle 90 rotates freely within the bore 92 and the dog unit 73 is stationary and non-rotating. As the transmission 10 is moved out of the neutral position, the spindle 90 moves away from the input axis and causes the dog unit 73 to move within the inner cylindrical surface 94 along an orbital path. As the dog unit 73 orbits the input axis, contact between the dogs 70 and the inner cylindrical surface 94 causes the dog unit 73 to rotate about the spindle 90 in a direction opposite the direction of rotation of the input shaft 12. This, in turn causes rotation of the rearward universal gear 100 and, consequently, rotation of the splined shaft 97 and the shaft 99. As the shaft 99 rotates, the rotation of the forward universal gear 102 causes the output shaft 60 to rotate within the bearings 104 about the output axis. As stated in regard to the previously described embodiments of the present invention, the greater the distance the spindle 90 is moved from the input axis, the greater the orbital motion of the dog unit 73 and, therefore, the larger the gearing ratio achieved. Similarly, in the neutral position, the output shaft is locked and may not be rotated in a direction opposite the angling of the dogs 70.

Those skilled in the art will understand that the variations described in regard to the first three embodiments may also be employed in a device according to the fourth embodiment of the present invention. For example, by extending the spindle through two dog units 73 each of which includes oppositely angled dogs 70, forward and reverse operation may be achieved. In addition, the more rugged construction of the dog unit 73 described in regard to the third embodiment of the present invention may also be employed in a transmission according to the fourth embodiment.

It will be understood by those skilled in the art that, in the place of the cylindrical member, a transmission according to the present invention may employ any member having an inner surface which extends along a portion of a circle to rotate dogs coupled to an output shaft as these dogs come into and out of contact with this part circular inner surface.

In addition, there are further variations of the disclosed embodiments which will be obvious to those skilled in the art. It is understood that these variations are within the scope of the invention which is limited only by the following claims.

What I claim is:

1. An apparatus for transmitting power from an input shaft to an output shaft, wherein the input shaft defines a first axis and the output shaft defines a second axis, the apparatus comprising:
    a first member including a contacting surface which extends along at least a portion of a circle defining a central axis substantially parallel to the first axis, the first member being coupled to the input shaft such that, upon rotation of the input shaft about the first axis, the first member moves so that the central axis orbits the first axis, and wherein a distance between the central axis and the first axis is variable; and
    a plurality of second members coupled to the output shaft and extending away from the second axis, each of the second members extending within the circle such that, when the first member moves so that the central axis orbits the first axis, contact between the contacting surface and the second members causes rotation of the output shaft about the second axis.

2. An apparatus according to claim 1 further comprising a housing, and wherein the first member is coupled to the housing such that it is non-rotatable about the center of the circle.

3. An apparatus according to claim 2 wherein, when the distance between the first axis and the central axis is substantially zero, the transmission is in a neutral position.

4. An apparatus according to claim 3 wherein, when the transmission is in the neutral position, the output shaft is prevented from rotating, in a first direction, about the second axis.

5. An apparatus according to claim 3 wherein, as the distance between the first axis and the central axis is increased from substantially zero to a predetermined maximum distance, the rotational speed of the output shaft, relative to the rotational speed of the input shaft, gradually increases from zero to a maximum rotational speed.

6. An apparatus according to claim 3 wherein each of the second members includes an initial portion extending substantially radially away from the second axis and an end portion oriented at an angle relative to the initial portion, the end portions of adjacent second members being substantially parallel to each other when the transmission is in a neutral position.

7. An apparatus according to claim 3 further comprising a plurality of forward second members and a plurality of reverse second members, wherein each of the forward second members includes an initial portion extending substantially radially away from the second axis and an end portion oriented at an angle relative to the initial portion, the end portions of adjacent forward second members being substantially parallel to each other when the transmission is in a neutral position and, wherein each of the reverse second members includes an initial portion extending substantially radially away from the second axis and an end portion oriented at an angle relative to the initial portion, the end portions of adjacent reverse second members being substantially parallel to each other when the transmission is in a neutral position.

8. An apparatus according to claim 1 wherein at least a portion of the contacting surface includes a plurality of projections substantially evenly spaced from each other.

9. An apparatus according to claim 8 wherein each second member includes a geared surface for contacting the projections on the contacting surface.

10. An apparatus for transmitting power from an input shaft to an output shaft, wherein the input shaft defines an input axis and the output shaft defines an output axis, the apparatus comprising:
    a housing;
    a first cylindrical member defining a first central axis and being coupled to the input shaft such that the distance between the first central axis and the input axis is variable;
    a second cylindrical member defining a second central axis and being slidably received within the first cylindrical member, the second cylindrical member being slidably coupled to the housing so that it may move such that the second central axis orbits the input axis, and wherein the second cylindrical member is coupled to the housing so that it is non-rotatable about the second central axis;
    a plurality of contacting members coupled to the output shaft and extending away from the output axis, wherein the distance between each contacting member and the adjacent contacting members is variable between a predetermined minimum distance and a predetermined maximum distance, the contacting members being disposed within the second cylindrical member such that, upon rotation of the input shaft about the input axis, the first and second cylindrical members move such that the first and second central axes orbit the input axis wherein contact between the orbiting second cylindrical member and the contacting members rotates the output shaft about the output axis.

11. An apparatus according to claim 10 wherein each contacting member defines a central end coupled to the output shaft and an outer end and, wherein each contacting member includes a contacting foot rotatably coupled to its outer end.

12. An apparatus according to claim 10 wherein the second cylindrical member includes an inner geared surface.

13. An apparatus according to claim 12 wherein each foot includes a geared surface for contacting the inner geared surface of the second cylindrical member.

14. An apparatus according to claim 10 further comprising a spring member coupled between the contacting members and the output shaft, the spring member being biased to urge the contacting members toward the second cylindrical member.

15. An apparatus according to claim 10 further including electronic means for varying the distance between the first central axis and the input axis.

16. An apparatus for transmitting power from a first shaft to a second shaft, wherein the first shaft defines a first axis and the second shaft defines a second axis, the apparatus comprising:
   means for gradually varying the rotational speed of the second shaft about the second axis relative to the rotational speed of the first shaft about the first axis; and
   means for preventing the rotation of the second shaft about the second axis in a first direction when the transmission is in a neutral position.

17. An apparatus according to claim 16 wherein the means for preventing the rotation of the output shaft about the output axis in a first direction, further includes means for preventing the rotation of the output shaft about the output axis in a second direction opposite to the first direction when the transmission is in a neutral position.

18. An apparatus for transmitting power from an input shaft to an output shaft, wherein the input shaft defines a first axis and the output shaft defines a second axis, the apparatus comprising:
   a plurality of first members each projecting outward from a central substantially circular unit defining a central axis substantially parallel to the first axis, the substantially circular unit being coupled to the input shaft such that, upon rotation of the input shaft about the first axis, the substantially circular unit moves so that the central axis orbits the first axis, and wherein a distance between the central axis and the first axis is variable, the substantially circular unit being coupled to the output shaft such that, upon rotation of the substantially circular unit about the central axis, the output shaft rotates about the second axis; and
   a second member including a contacting surface which extends along at least a portion of a circle, wherein, in an operative position, the first members extend away from the central axis toward the contacting surface of the second member such that, upon motion of the substantially circular unit relative to the first axis, contact between the contacting surface and the first members causes rotation of the substantially circular unit about the central axis and, consequently, causes rotation of the output shaft about the second axis.

* * * * *